(12) United States Patent
Jang

(10) Patent No.: US 7,307,686 B2
(45) Date of Patent: Dec. 11, 2007

(54) METHOD OF MANUFACTURING A PANEL FOR A LIQUID CRYSTAL DISPLAY

(75) Inventor: Yang-Gyu Jang, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/322,847

(22) Filed: Dec. 30, 2005

(65) Prior Publication Data

US 2006/0146268 A1  Jul. 6, 2006

(30) Foreign Application Priority Data

Jan. 3, 2005  (KR) .................... 10-2005-0000183

(51) Int. Cl.
*G02F 1/1339* (2006.01)
(52) U.S. Cl. .................. 349/190; 349/153; 349/92
(58) Field of Classification Search ........... 349/153, 349/190
See application file for complete search history.

(56) References Cited

U.S. PATENT DOCUMENTS 5,854,664 A * 12/1998 Inoue et al. ............. 349/92

2001/0022637 A1 * 9/2001 Yu .......................... 349/102
2002/0191140 A1 * 12/2002 Eguchi et al. ............ 349/149
2003/0038030 A1 * 2/2003 Amshey et al. .......... 204/456
2003/0174271 A1 * 9/2003 Fujikawa .................. 349/149

FOREIGN PATENT DOCUMENTS

JP  2004151215 A * 5/2004

* cited by examiner

*Primary Examiner*—Huyen Ngo
(74) *Attorney, Agent, or Firm*—MacPherson Kwok Chen & Heid LLP

(57) ABSTRACT

A method for manufacturing a panel for a liquid crystal display is presented. The method includes forming at least one model mark according to a classified model on a panel of the mother glass having at least one liquid crystal cell area, forming at least one sealant on the panels as a unit with the liquid crystal cell area, forming at least one short point on the panel as a unit with the liquid crystal cell area, and forming a liquid crystal layer in the region enclosed by the sealant of the liquid crystal cell area.

8 Claims, 8 Drawing Sheets

US 7,307,686 B2

METHOD OF MANUFACTURING A PANEL FOR A LIQUID CRYSTAL DISPLAY

CROSS-REFERENCE TO RELATED APPLICATION(S)

This patent application claims priority from Korean Patent Application No. 10-2005-0000183 filed on Jan. 3, 2005, the content of which is incorporated by reference herein in its entirety.

BACKGROUND OF THE INVENTION (a) Field of the Invention

The present invention relates to method manufacturing a panel for a liquid crystal display.

(b) Description of the Related Art

Liquid crystal displays (LCDs) are one of the most widely used types of flat panel displays today. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs including field-generating electrodes on each of the panels, one type of LCD provides a plurality of pixel electrodes arranged in a matrix on one panel and a common electrode covering an entire surface of the other panel. In this type of LCD, image display is accomplished by separately applying voltages to the respective pixel electrodes. For application of the separated voltages, a plurality of three-terminal thin film transistors (TFTs) are connected to the respective pixel electrodes, and a plurality of gate lines transmitting signals for controlling the TFTs and a plurality of data lines transmitting voltages to be applied to the pixel electrodes are provided on the panel. In addition, a plurality of short points to electrically connect the two panels is formed on the panel having the gate and data lines, and the common electrode receives a predetermined signal via the short points.

According to a conventional method of fabricating the LCD, alignment films for aligning the liquid crystal molecules of the liquid crystal material are coated on the two panels and subjected to alignment treatment. Spacers are spread on one of the panels, and a sealant is printed along the periphery of the panel. The sealant has a liquid crystal injection hole, and the short points are printed along the periphery of the panel. The two panels are aligned and attached to each other by hot press. A liquid crystal material is injected between the two panels through the injection hole and the injection hole is sealed, thereby forming a liquid crystal cell.

Recently, a panel assembly made of one mother glass having a plurality of liquid crystal cell areas is manufactured to enhance the fabrication productivity. The panel assembly is separated into four, six, or eight liquid crystal cell areas by scribing the panel assembly before the injection of the liquid crystal material.

Although the size of the liquid crystal cell areas are similar to each other, the sealants are printed with different shapes, and the arrangement of the short points are different with respect to the panel assembly because of the differences of the structure of the liquid crystal cell areas. Due to these differences, a technician or operator has to identify a program among a plurality of programs for the formations of the sealant and the short points in the manufacturing process before executing the fabrication steps.

The human involvement results in generation of defects, as there are inevitably cases where incorrect program is selected. A method of efficiently fabricating the LCD panels with a lower error rate is desired.

SUMMARY OF THE INVENTION

A method for manufacturing a panel for a liquid crystal display is provided. The method includes forming at least one model mark according to classified model on a panel of the mother glass having at least one liquid crystal cell area, forming at least one sealant on the panels as a unit with the liquid crystal cell area, forming at least one short point on the panel as a unit with the liquid crystal cell area, and forming a liquid crystal layer in the region enclosed by the sealant of the liquid crystal cell area.

The sealants and the short points may be formed through predetermined program according to the model.

The model mark may be respectively formed according to the sealants and the short points.

The model mark may be formed at the different positions according to the model.

The model mark may be respectively formed according to liquid crystal cell area.

The model mark may be disposed outside the liquid crystal cell area.

DETAILED DESCRIPTION OF EMBODIMENTS

Figure 1:
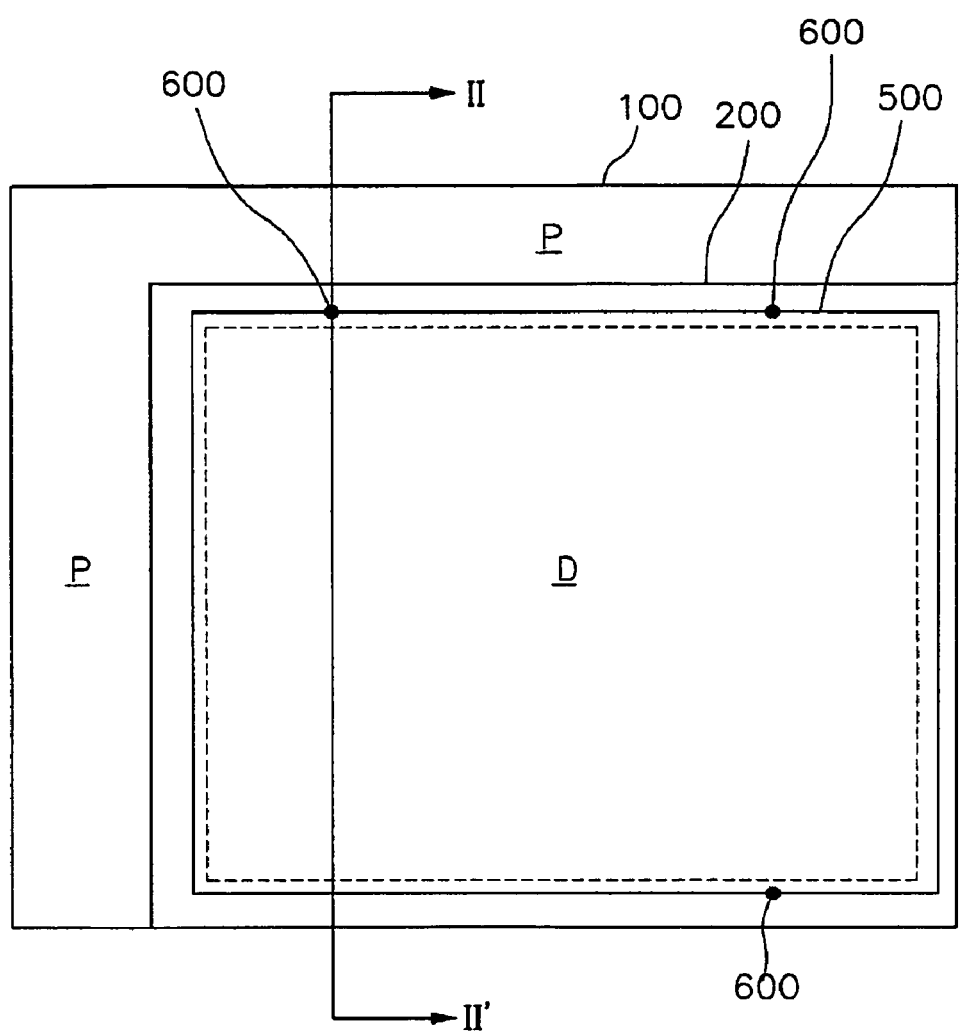
FIG. 1 is a plan view of a liquid crystal display completed by a method for manufacturing a liquid crystal display according to an embodiment of the present invention.

The present invention now will be described more fully with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or panel is referred to as being "on" another element, it can be directly on the other element or intervening elements may also be present.

The structure of a liquid crystal display fabricated by a method of fabricating a liquid crystal display according to an embodiment of the present invention will be first described.

Figure 2:
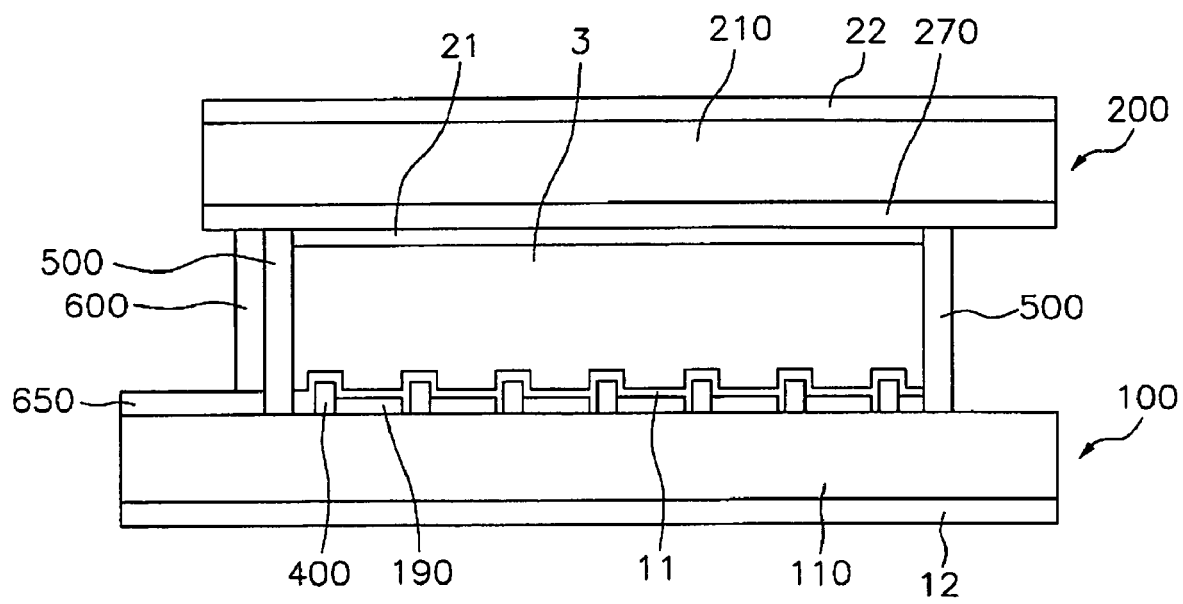
FIG. 2 is a sectional view of the liquid crystal display shown in FIG. 1 taken along line II-II'.

FIG. 1 is a plan view of a liquid crystal display completed by a method for manufacturing a liquid crystal display according to an embodiment of the present invention, and FIG. 2 is a sectional view of the liquid crystal display shown in FIG. 1 taken along line II-II'.

As shown in FIGS. 1 and 2, a liquid crystal display completed by a manufacturing method according to an embodiment of the present invention includes two insulating panels 100 and 200 facing each other and a liquid crystal layer 3, which is formed of liquid crystal material injected between the panels 100 and 200. This liquid crystal display has a display area D displaying images, and a peripheral area P formed outside the circumference of the display area D and including a plurality of drivers or a plurality of assistance signal lines such as electrostatics discharge circuits and repair lines. Here, the dot line in a closed configuration represents the display area D.

The lower panel 100 includes a plurality of thin film transistors 400 and a plurality of pixel electrodes respectively connected to the thin film transistors, which are arranged in a matrix. In addition, the lower panel 100 has the signal lines including a plurality of gate lines for transmitting gate signals from the drivers to the thin film transistors and a plurality of data lines for transmitting data signals from the drivers to the pixel electrodes via the thin film transistors. The lower panel 100 is sometimes called a thin film transistor array panel.

The upper panel 200 includes a common electrode 270 generating electric fields in cooperation with the pixel electrodes 190, which reorient liquid crystal molecules in the liquid crystal layer 3. The pixel electrodes 190 are formed on the upper panel 200. The panel 200 may include a plurality of color filters (not shown) disposed in the areas corresponding to the pixel electrodes 190 and a light blocking member (not shown) having a plurality of openings disposed in the areas corresponding to the color filters. The upper panel 200 is sometimes called a common electrode panel.

A sealant 500 is formed outside the circumference of the display area D such that the liquid crystal layer 3 is sealed between the panels 100 and 200.

Because the lower panel 100 is larger than the upper panel 200, a portion of the lower panel 100 is not covered by the upper panel 200 upon assembly of the panels. The peripheral area P includes this uncovered portion of the lower panel 100.

A plurality of short points 600 electrically connecting the upper and the lower panels 100 and 200 for transmitting a common voltage are formed outside the circumference of the display area D between the panels 100 and 200, and overlap the sealant 500. In addition, a common signal line 650 that transmits the common voltage to the short points 600 from an outside component is formed on the lower panel 100 exposed from the upper panel 200. The sealant 500 and the short points 600 may not overlap to each other.

Alignment layers 11 and 21, which may be homeotropic or isotropic, are coated on the inner surfaces of the panels 100 and 200.

Polarizers 12 and 22 are provided on outer surfaces of the panels 100 and 200 such that their polarization axes may be crossed. One of the polarizers may be omitted when the LCD is a reflective LCD.

The LCD may further include at least one retardation film (not shown) for compensating the retardation of the LC layer 3. The retardation film has birefringence and gives a retardation opposite to that given by the LC layer 3. The retardation film may include uniaxial or biaxial optical compensation film, in particular, negative uniaxial compensation film.

The LCD may further include a backlight unit (not shown) supplying light to the LC layer 3 through the polarizers 12 and 22, the retardation film, and the panels 100 and 200.

The LC layer 3 has negative or positive dielectric anisotropy.

The process of fabricating a liquid crystal display according to an embodiment of the present invention will be now described in detail.

Figure 3A:
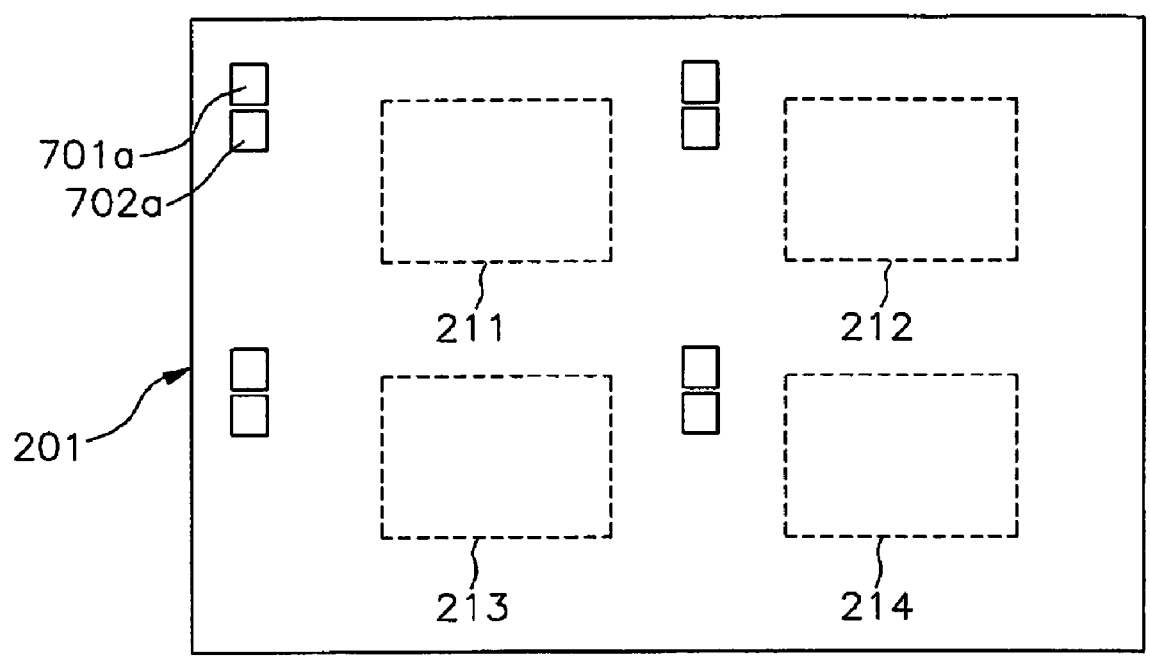
FIGS. 3a and 3b are plan views showing the structures of the liquid crystal panels of a mother glass according to a different model in the method for manufacturing a liquid crystal display according to an embodiment of the present invention.
Figure 3B:
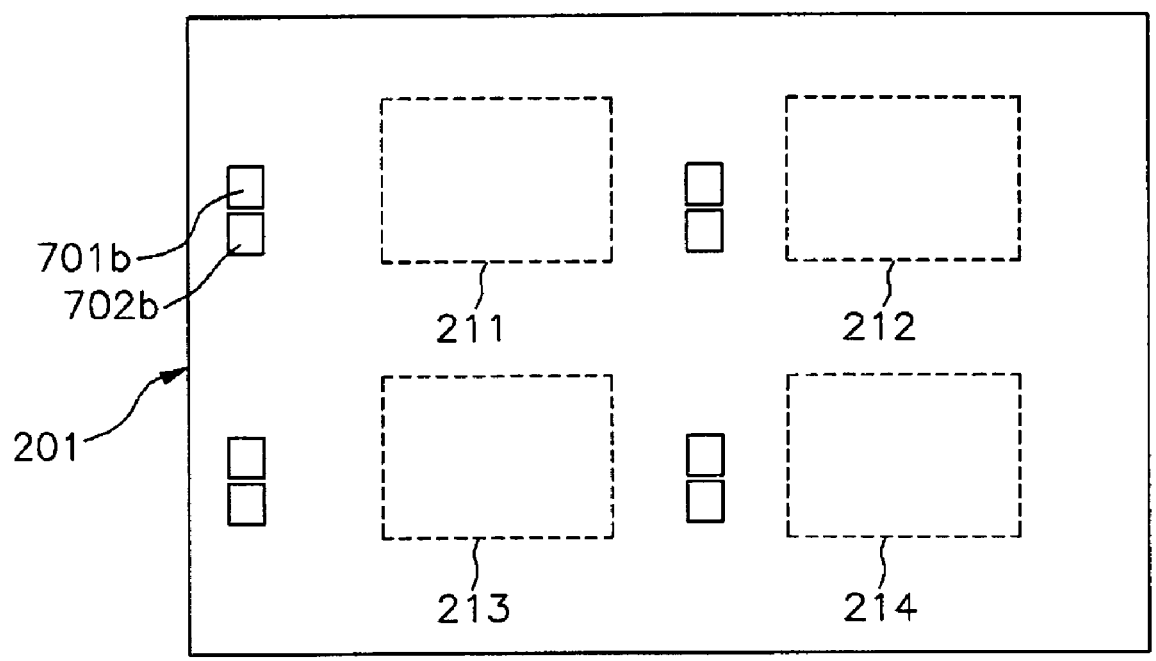
Figure 4A:
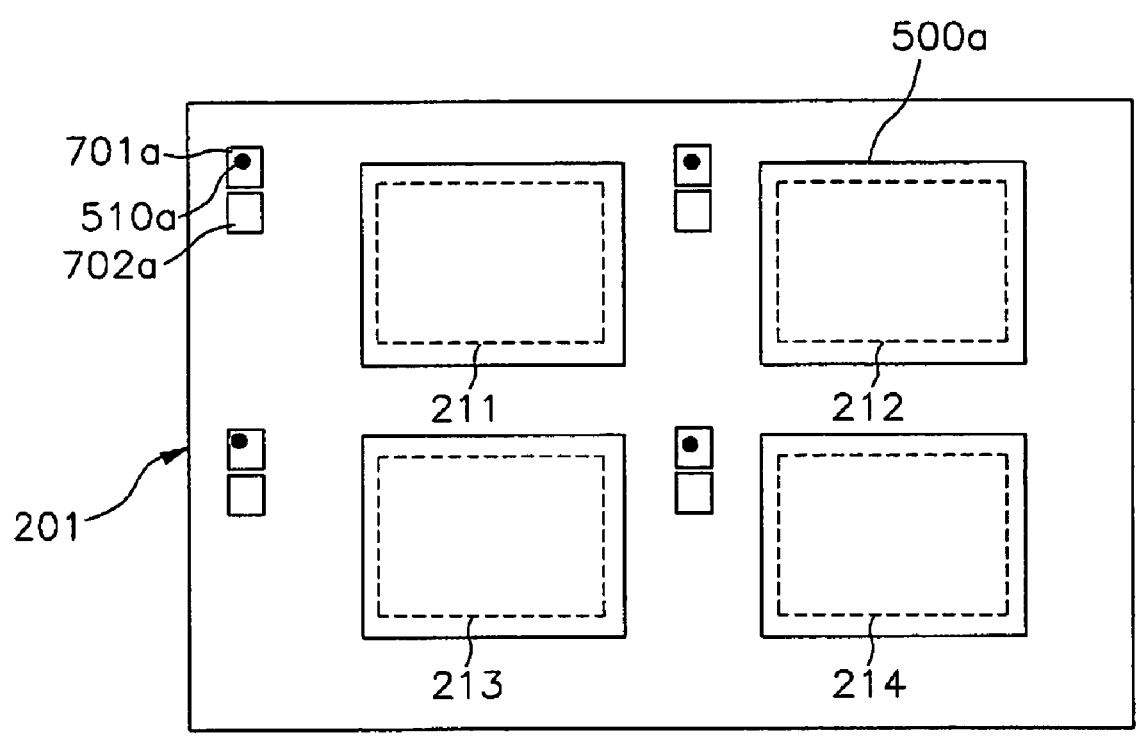
FIGS. 4a and 4b are plan views showing the structures of the liquid crystal panels of the mother glass with the respect to one model after printing sealants in the method for manufacturing a liquid crystal display according to an embodiment of the present invention.
Figure 4B:
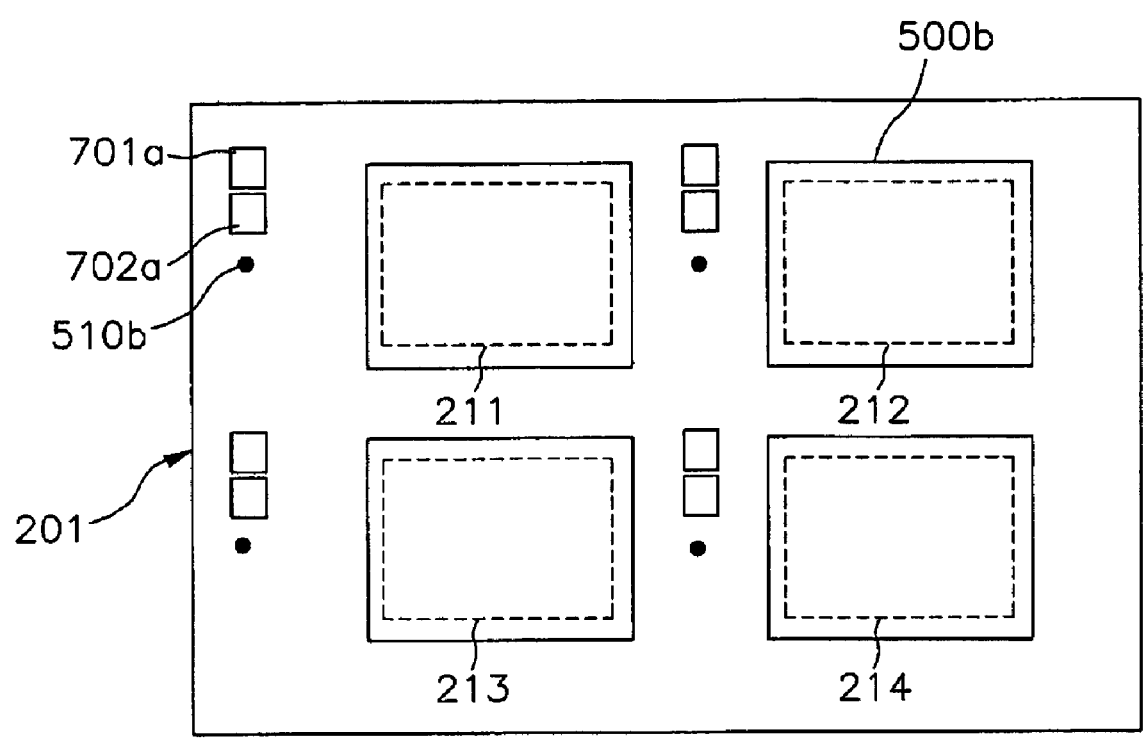
Figure 5A:
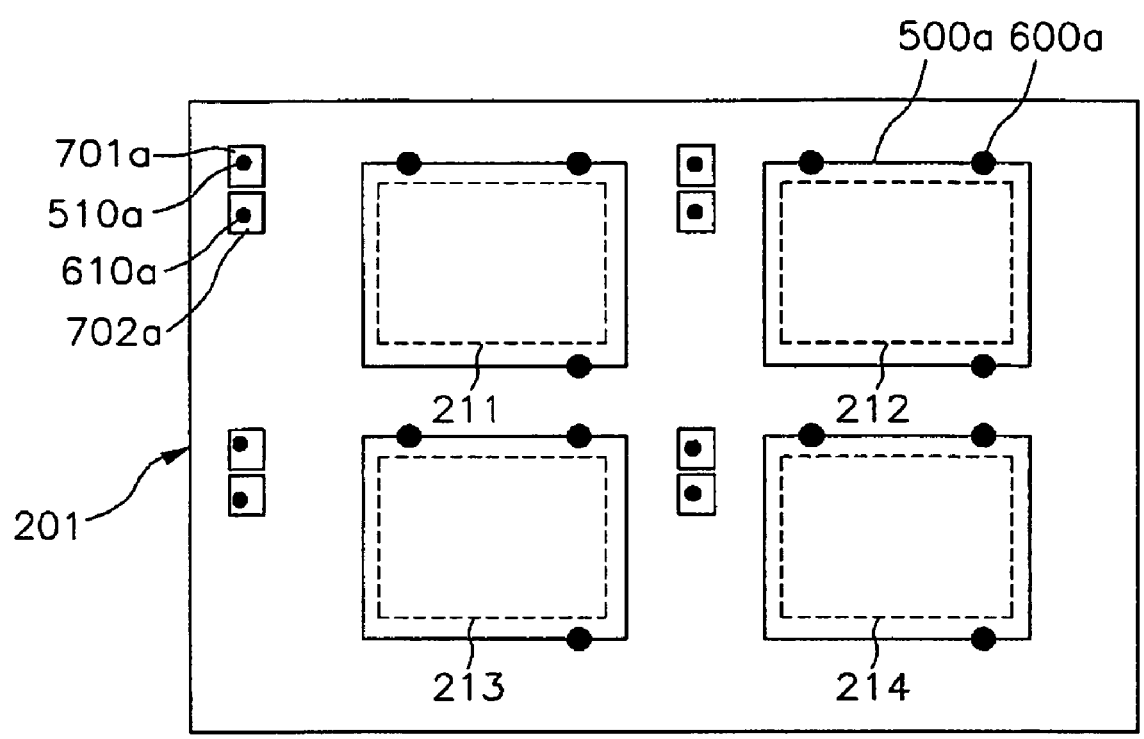
FIGS. 5a and 5b are plan views showing the structures of the liquid crystal panels of the mother glass with the respect to one model after forming short points in the method for manufacturing a liquid crystal display according to an embodiment of the present invention.
Figure 5B:
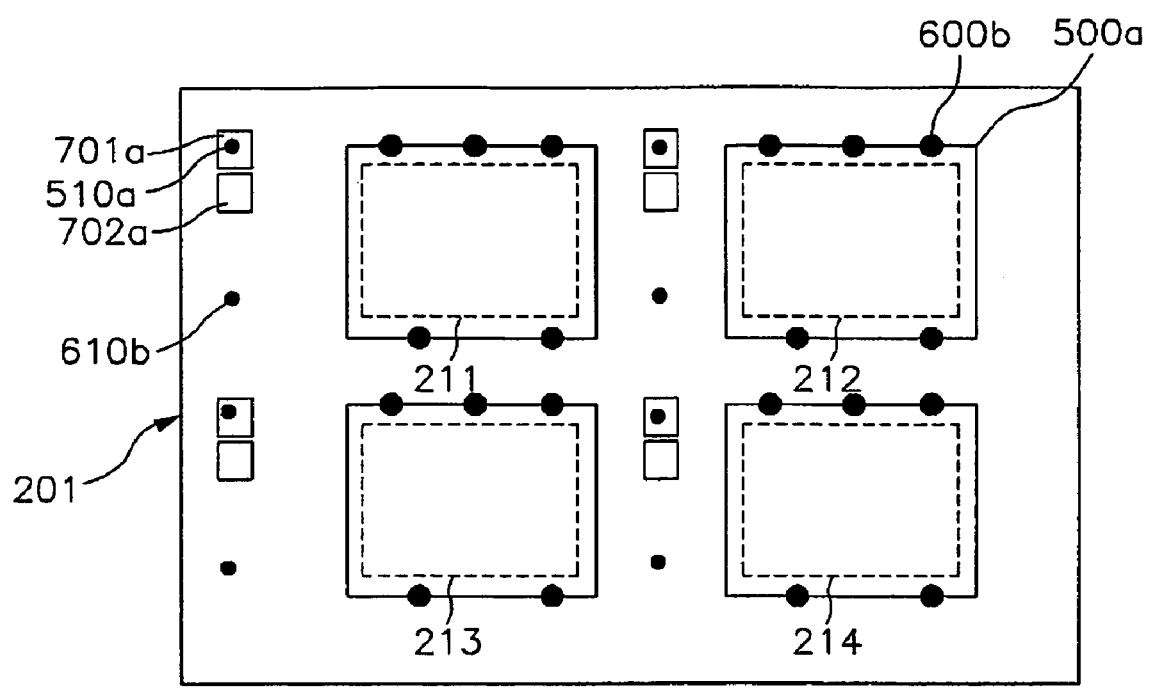

FIGS. 3a and 3b are plan views showing the structures of the liquid crystal panels of a mother glass according to a different model in the method for manufacturing a liquid crystal display according to an embodiment of the present invention, FIGS. 4a and 4b are plan views showing the structures of the liquid crystal panels of the mother glass with the respect to one model after printing sealants in the method for manufacturing a liquid crystal display according to an embodiment of the present invention, and FIGS. 5a and 5b are plan views showing the structures of the liquid crystal panels of the mother glass with the respect to one model after forming short points in the method for manufacturing a liquid crystal display according to an embodiment of the present invention.

In the manufacturing method of a liquid crystal display according to the present invention, a liquid crystal panel 201 made of one mother glass is subject to the processes for forming the liquid crystal layer 3 (as shown in FIGS. 1 and 2), forming cell gap members (not shown), printing the sealants 500 (as shown in FIGS. 1 and 2), printing the short points 600 (as shown in FIGS. 1 and 2) and combining the two panels 100 and 200 (as shown in FIGS. 1 and 2). As shown in FIGS. 3a and 3b, the liquid crystal panels 201 includes at least liquid crystal cell area for a liquid crystal display. In the example that is illustrated, there are four liquid crystal cell areas 211, 212, 213 and 214, each of which is used as one of the two panels 100 and 200. The cutting into separate cell areas 211, 212, 213 and 214 occurs only after liquid crystal formation process and the panel assembling process etc. have been completed.

In the manufacturing method of a liquid crystal display according to the present invention, the sealants 500 and the short points 600 will be printed on the liquid crystal panels 201 as a unit of each of the liquid crystal cell areas 211, 212, 213 and 214 in the processes for the formation of the sealants 500 and the short points 600. The liquid crystal panels 201 are classified into a plurality of models according to the size and shape of the sealants 500 and the short points 600 which will be formed on the liquid crystal panels 201. Referring to FIGS. 3A and 3B, the model marks 701a, 701b, 702a and 702b, each of which may indicate a different model, are formed on the liquid crystal panels 201. In the case of model A, model marks 701a and 702a are formed on the liquid crystal panels 201 as shown in FIG. 3A, and in the case of model B, model marks 701b and 702b are formed on the liquid crystal panels 201 as shown in FIG. 3B. The model marks for the sealants 500 in models A and B are indicated by reference numerals 701a and 701b, and the model marks for the short points 600 in models A and B are indicated by reference numerals 702a and 702b.

First, the panel 201, which is loaded on the first loading unit, is transported to a spacer-dispersing unit. The spacers (not shown) for maintaining the cell gap between the panels 100 and 200 are dispersed in a predetermined arrangement on an inner face of the panel 201 at the spacer-dispersing unit. At this time, it is preferable that the spacers be spherical or cylindrical and have a diameter that is 10-30% greater than the desired cell gap between the panels 100 and 200.

Instead of dispersing the spacers in this manner, it is possible to deposit an insulating layer on the panel 201 and pattern the insulating layer to form a plurality of columnar spacers through a photolithographic process. Because the dispersing of the spacers exchanges by the photolithographic process, an additional process is not generated, and such an alternative process is particularly advantageous for large panels with the uniform and predetermined positions.

Following the above process, the panel 201 is transported from the spacer-dispersing unit to a sealant-applying unit, and the sealant 500 is deposited on the panel 201 at the sealant-applying unit. The sealant 500 is deposited based on the program according to the predetermined model of the panels 201. For example, when the panel 201 is of model A, the sealant 500*a* is formed using the predetermined program according to model A, and a sealant mark 510*a* is formed on the model marks 701*a* and 702*a*. Referring to FIG. 4*a*, the presence of a sealant mark 510*a* is formed in the model mark 701*a* for the sealant of the model marks 701*a* and 702*a* is confirmed when detecting the model marks 701*a* and 702*a*. Based on the marks, the system will determine that the sealant 500*a* is correctly formed using the predetermined program for model A on the panel 201 of the model A. In contrast, in the case of FIG. 4*b*, the presence of a sealant mark 510*b* on a portion of the panel 201 outside the model marks 701*a* and 702*a* and the absence of the sealant mark in the model mark 701*a* is confirmed when detecting the model marks 701*a* and 702*a*. Accordingly, the system will determine that the sealant 500*b* is incorrectly formed using the predetermined program for model B on the panel 201 of the model A, and that a defect is generated. Based on this determination, an adjustment can be made such that the sealant 500*a* is properly formed using the predetermined program according to model A on the panel 201 of the model A. Thus, the above process helps prevent the formation of a large quantity of the same defect.

The sealant 500 may be formed in a closed configuration without a liquid crystal injection hole. The sealant 500 may be realized through a heat-hardening material or an infrared ray-hardening material, and may include spacers for better maintaining the cell gap between the panel s 100 and 200.

Following the above, the panel 201 is transported from the sealant-applying unit to a short point applying unit, and the short points 600 are formed on the panel 201 at the short point applying unit. The short points 600 are formed based on the program according to the predetermined model of the panels 201. For example, when the panel 201 is model A, the short point 600*a* is formed using the predetermined program according to model A, and a short point mark 610*a* is formed on the model marks 701*a* and 702*a*. Referring to FIG. 5*a*, the presence of a short point mark 610*a* in the model mark 702*a* for the short point of the model marks 701*a* and 702*a* is confirmed when detecting the model marks 701*a* and 702*a*. Accordingly, the system can determine that the short point 600*a* is correctly formed using the predetermined program according to model A on the panel 201 of the model A. In contrast, in the case of FIG. 5*b*, the presence of a sealant mark 610*b* outside the model marks 701*a* and 702*a* and the absence of a short point mark in the model mark 702*a* is confirmed when detecting the model marks 701*a* and 702*a*. In this case, the system can determine that the short point 600*b* is incorrectly formed using the predetermined program according to the model B on the panel 201 of the model A. Thus, it can be determined that a defect is generated. Based on this determination, an adjustment can be made such that the short point 600*a* can be correctly formed using the predetermined program according to the model A on the panel 201 of the model A. Thus, the above process prevents the formation of a large quantity of the same defect.

Next, predetermined amounts of the liquid crystal material are deposited on the liquid crystal cell regions 111, 121, 131 and 141 of the panel 201 using a liquid crystal depositor (not shown) such that the liquid crystal layer 3 is formed to correspond to the sizes of the liquid crystal cell regions 111, 121, 131 and 141.

Next, the two panels 100 and 200 are aligned and combined through a panel-attaching process, and the liquid crystal layer 3 is formed. The conjoined panels 100 and 200 are transported to a cutting unit (not shown), and is cut into portions corresponding to the liquid crystal cell regions 111, 121, 131 and 141, thereby obtaining liquid crystal cells for LCDs.

As described, the process of the invention entails forming a model mark and confirming a predetermined program according to the model based on the model mark to form the sealant and the short point. Accordingly, the defect due to the program error may be easily detected. This easy detection of defect at an early stage in the fabrication process prevents the defect from being mass-produced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of manufacturing a panel for a liquid crystal display, the method comprising:
    forming at least one model mark according to a classified model on a surface of a mother glass having at least one liquid crystal cell area;
    forming at least one sealant on the panel in the liquid crystal cell area;
    forming at least one short point on the panel in the liquid crystal cell area;
    forming a position mark on the panel along with the sealant or the short point;
    determining whether the position of the sealant or the short point is correct by comparing the location of the position mark with the location of the model mark; and
    forming a liquid crystal layer in the region enclosed by the sealant of the liquid crystal cell area.

2. The method of claim 1, wherein the at least one sealant and the short points point are formed through a predetermined program according to the classified model.

3. The method of claim 1, wherein the position mark comprises at least one of a sealant mark or a short point mark.

4. The method of claim 1, wherein the model mark is formed at different positions depending on the classified model.

5. The method of claim 1, wherein the model mark is formed according to liquid crystal cell area.

6. The method of claim 1, wherein the model mark is disposed outside the liquid crystal cell area.

7. The method of claim 1 further comprising determining that the position of the sealant or the short point is correct if the position mark overlaps the model mark.

8. The method of claim 1 further comprising adjusting the formation of the sealant or the short point if the position mark is a certain distance away from the model mark.

* * * * *